United States Patent [19]

Alligood

[11] Patent Number: 4,527,873
[45] Date of Patent: Jul. 9, 1985

[54] CAMERA LOADING DOOR INTERLOCK
[75] Inventor: John H. Alligood, Rochester, N.Y.
[73] Assignee: Eastman Kodak Company, Rochester, N.Y.
[21] Appl. No.: 604,251
[22] Filed: Apr. 26, 1984
[51] Int. Cl.³ .............................................. G03B 17/00
[52] U.S. Cl. .................................................... 354/121
[58] Field of Search ........................ 354/121, 202, 288

[56]        References Cited
U.S. PATENT DOCUMENTS

| | | | |
|---|---|---|---|
| 4,202,614 | 5/1980 | Harvey | 354/121 |
| 4,309,096 | 1/1982 | Sethi | 354/121 |
| 4,449,806 | 5/1984 | Wong et al. | 354/121 |
| 4,492,443 | 1/1985 | Spencer et al. | 354/121 |

Primary Examiner—John Gonzales
Attorney, Agent, or Firm—Robert L. Randall

[57]            ABSTRACT

A camera loading door interlock which is simple and inexpensive, and yet which assures the proper loading-/unloading sequence for a disk-type camera in which the film cartridge incorporates a dark slide which must not be opened before the camera loading door is securely closed, and which must be closed before the camera loading door is opened.

5 Claims, 8 Drawing Figures

CAMERA LOADING DOOR INTERLOCK

BACKGROUND OF THE INVENTION

1. Field of the Invention

The present invention relates to a camera loading door interlock which is simple and inexpensive, and yet which assures the proper loading/unloading sequence for a disk-type camera in which the film cartridge incorporates a dark slide which must not be opened before the camera loading door is securely closed, and which must be closed before the camera loading door is opened.

2. Description of the Prior Art

Cameras for use with disk film cartridges have been known. One example is shown in U.S. Pat. No. 4,202,614 which illustrates a camera for use with a disk film cartridge in which the cartridge dark slide is moved with the film disk. With this arrangement the film disk must be returned to an initial position in order for the dark slide to protect the film from fogging. After use, the camera is arranged to return the film to the initial position whereby the dark slide is also positioned to protect the film before the film loading door can be opened. With this arrangement the camera loading door must be closed before the film can be advanced, thereby opening the dark slide. However, such a camera/cartridge construction does not permit the operation of the dark slide independently of the film disk and thus does not provide the desired dark slide/door latch interlock since the dark slide is only moved when the film disk is moved. With this arrangement, it is not possible to remove a partially exposed film disk from the camera and then to reload that disk to use the remaining unexposed frames without double exposing those frames first used.

Disk cameras for use with cartridges having a dark slide movable independently of the film disk, exemplified by U.S. Pat. No. 4,309,096, are currently marketed by Eastman Kodak Company and others. These cameras are provided with a loading door which is secured in the closed position by a suitable lever-operated latch. In most such cameras, the latch-operating lever is also operatively connected to a dark-slide-engaging lever in such a manner that the dark slide is properly oriented before the latch is operated. The latch-operating lever is commonly provided with a detent which is intended to assure that the preferred dark slide orientation/latch operation sequence is maintained. However, most such detents merely consist of a spring member which is relatively easily overcome by a moderate force on the latch-operating lever. As a result, it is possible for the camera user to be able to manipulate the operating lever in such a way that the interlock between the opening and closing of the dark slide and the opening or closing of the loading door latch is defeated. This permits the door latch to be opened without ensuring that the dark slide is completely closed, or permits the dark slide to be opened before the loading door is securely closed. Thus, the user may find that one or more frames of the film disk are partially or completely fogged because the dark slide was at least partially open at the same time that the camera loading door was open.

SUMMARY OF THE INVENTION

Accordingly, the present invention provides a camera door latch/dark slide operating interlock that is simple and effective, thus ensuring that the dark slide is closed before the loading door is opened and not opened before the loading door is securely closed. Though the arrangement of the present invention is relatively simple and economical to fabricate, it is sufficiently rugged that a camera user is unlikely to accidentally defeat the interlock feature.

According to one aspect of the present invention, a camera is provided which accepts a disk film cartridge with a dark slide which is movable independently of the film disk. The camera has a cartridge loading door, a linearly movable latch member arranged to engage the door when the door is in the closed position, spring means for urging the latch member into engagement with the door, an arcuately movable dark slide-engaging lever, and a rotatable actuating member operatively connected to the dark slide-engaging lever. Disengaging means is provided on the actuating member for positively engaging the latch member and for moving the latch member against the force of the spring means into a disengaged position for disengaging the door only after the actuating member has first moved the dark slide-engaging lever to close the dark side. A retainer element is carried by the latch member and is movable transversely of the latch member for engaging a portion of the camera to hold the latch member in a disengaged position. The retainer element is engageable by the door only when the door is closed for releasing the latch member from the disengaged position whereby the door is engaged by the latch member and held closed. Interlock means is provided on the actuating member cooperating with the latch member for preventing movement of the actuating member to open the dark slide until the door is engaged by the latch member and thereafter for positively engaging the latch member when the dark slide is open to pull the latch member into positive engagement with the door.

According to a further aspect of the present invention, a first portion of the spring means is arranged to resiliently resist the linear movement of the latch member and a second portion is arranged for movement transversely of the latch member and forms the retainer element.

Various means for practicing the invention and other features and advantages thereof will be apparent from the following detailed description of illustrative preferred embodiments of the invention, reference being made to the accompanying drawings.

IN THE DRAWINGS

DESCRIPTION OF THE ILLUSTRATIVE PREFERRED EMBODIMENTS

Figure 1:
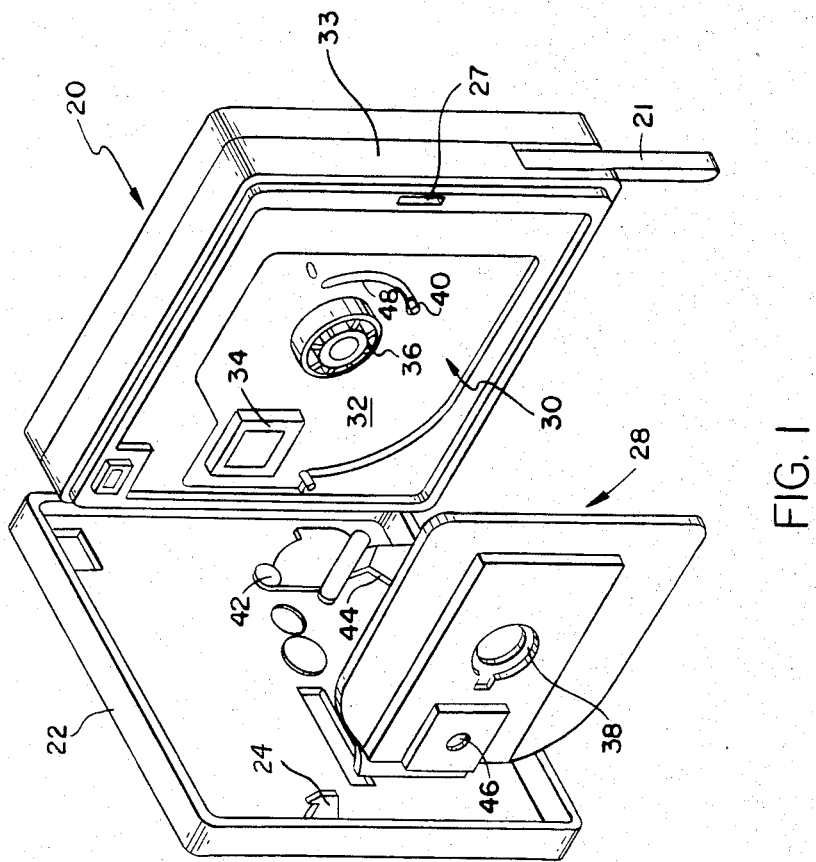
FIG. 1 is a rear perspective view of a camera depicting the loading door in an open position and showing a film cartridge in position for loading into the camera.

Although the present invention is applicable to various kinds of cameras, the illustrative embodiments are directed to cameras adapted to use disk film cartridges and are of the type disclosed in commonly-assigned copending application Ser. No. 500,505, entitled CAMERA MECHANISM, now Pat. No. 4,492,443.

General Description of Camera

Referring now to the drawings and in particular to FIGS. 1-4, FIG. 1 shows a rear loading door 22 of a camera 20 of the type disclosed in the above-identified application Ser. No. 500,505, wherein the door is hinged to the camera body, along the left-hand edge in the illustration, and is held in its closed position by a latch 24 and a latch hook 26 (see FIGS. 2-8), that is releasable by means of lever 21. When the loading door is open, as shown, the film cartridge 28 is insertable into cartridge chamber 30, in which the front wall of the cartridge lies adjacent the rear surface of an intermediate camera wall 32, located rearwardly of the major components of the camera mechanism. When the cartridge is loaded into the chamber 30, a film support frame member 34, aligned with the camera lens, is received in the exposure window of the cartridge, in a manner known in the art. A camera hub member 36 engages the film hub 38 in the film cartridge, and an arcuately movable dark slide operating pin or lever 40 engages the dark slide in the cartridge, not shown. Closing the film loading door 22, causes spring members (not shown) on the door to seat the cartridge against the intermediate wall and brings a pressure applying member 42, supported by spring arms 44, into alignment with a cartridge pressure plate member 46. Latching of the door causes the dark slide operating pin 40 to move in an arcuate slot 48 in the camera intermediate wall to move the dark slide out of alignment with the exposure window of the cartridge so that the exposure region of the film disk can be supported against frame member 34 by the pressure plate member under the influence of the pressure applying member 42. After the film disk has been exposed, the process by which the cover door is unlatched moves the dark slide to close the exposure window. This must occur before the door can be opened, thereby preventing accidental exposure of the exposed film. The foregoing sequence is functionally similar to that followed in commercial cameras.

Figure 2:
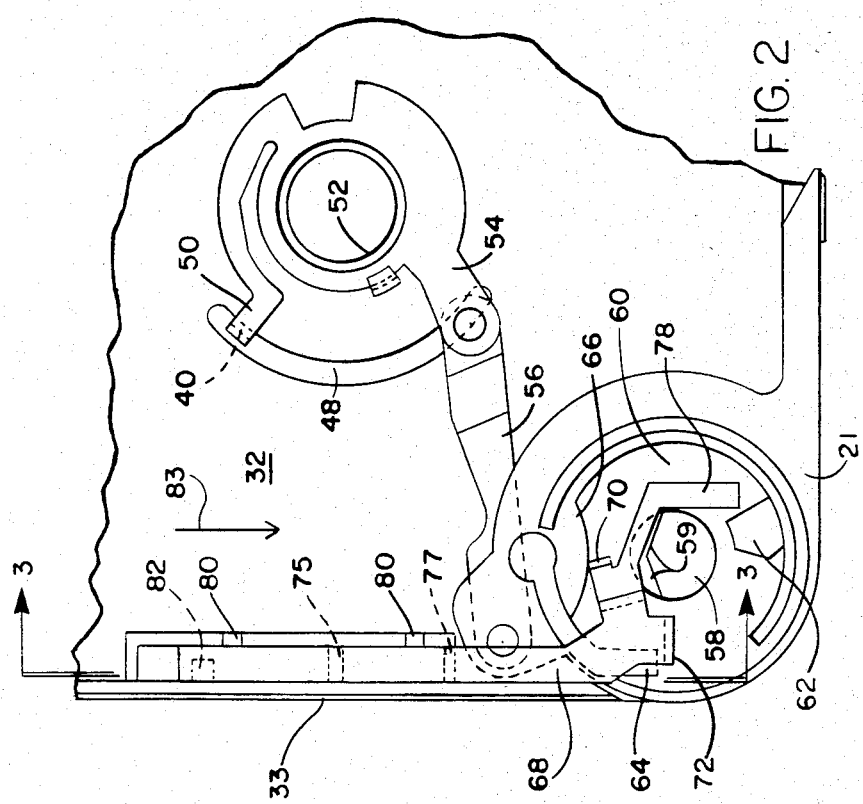
FIG. 2 is a plan view of a portion of the interior of the front of the camera of FIG. 1 illustrating the location and interconnection of the dark slide-engaging lever, the actuating member, and the latch member.
Figure 3:
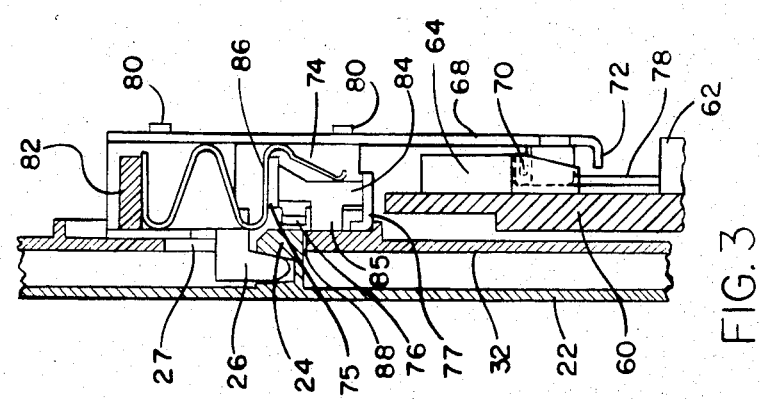
FIG. 3 is a sectional view of the latch member taken along lines 3—3 of FIG. 2.
Figure 4:
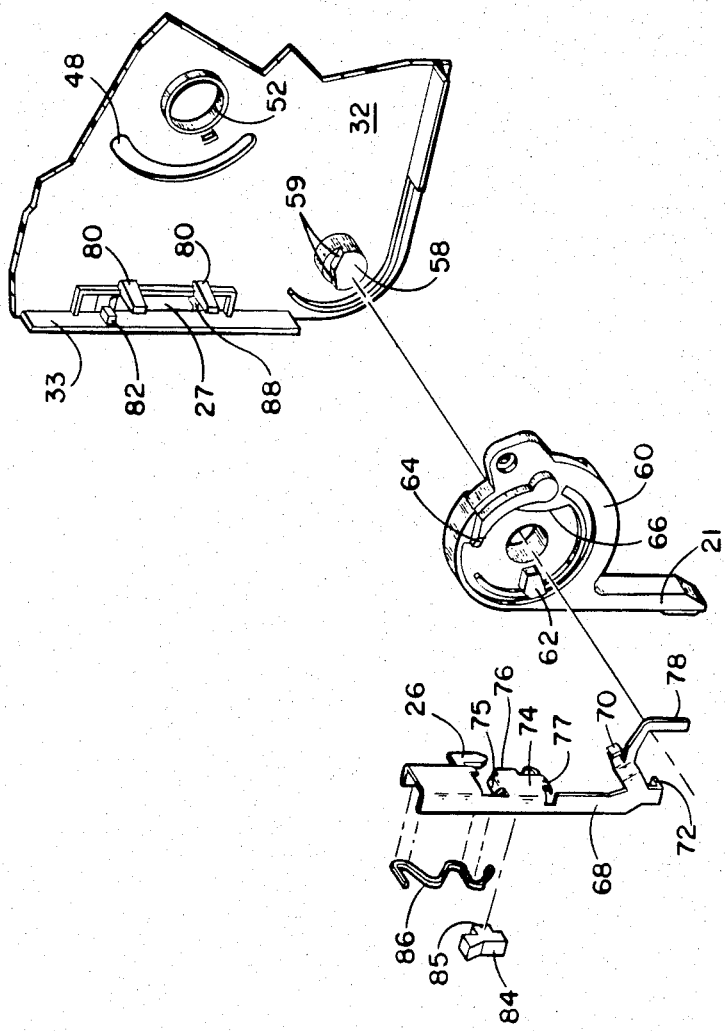
FIG. 4 is an exploded perspective view of the actuating member and latch member with respect to the camera portion illustrated in FIGS. 2 and 5.

Referring now to FIGS. 2-4, the details of the apparatus in accordance with the present invention will be illustrated and described.

FIG. 2 illustrates a plan view of a portion of the surface of intermediate wall 32 opposite from that illustrated in FIG. 1, i.e. the front of the intermediate wall, with components of the camera not relating to the door latch/dark slide interlock omitted for clarity. The dark slide operating pin 40 is a portion of operating lever 50 mounted for rotation about opening 52 through which camera hub member 36 (FIG. 1) extends. The operating lever 50 is provided with an ear 54 which is connected via link 56 to a rotatable actuating member 60. The actuating member 60 is mounted for rotation about stud 58 extending from the front surface of intermediate wall 32. The outer end of stud 58 is relieved at 59 for clearance purposes as will be described hereinafter. Actuating member 60 is a part of lever 21 which facilitates the manual operation of the actuating member by the camera user. As illustrated in FIG. 2, when the camera user engages lever 21 and rotates it clockwise, the operating lever 50 is rotated in a counterclockwise direction via link 56.

The actuating member 60 is provided with a disengaging means comprising cam portion 62, and interlock means comprising cam portion 64 and cam portion 66. These cam portions cooperate with various portions of a linearly movable latch member 68, in a manner to be described hereinbelow. The latch member 68 is generally h-shaped and is arranged with the lower portion overlying the actuating member 60. The lower portion of the latch member is provided with flanges 70 and 72 arranged for cooperation with the cam portions of the actuating member. One portion of the lower end of the latch member forms a stabilizer leg 78 which engages the periphery of stud 58, the relief 59 of which provides the necessary clearance. The upper stem of the h-shaped latch member carries the latch and retainer portions which extend in a plane perpendicular to the plane of the h. (See FIG. 4.) The latch portion carries the latch hook 26 which is arranged to pass through opening 27 in the intermediate wall 32. Disposed between the latch hook 26 and the lower portion of the latch member is a retainer cage portion 74 which is formed by upturned flange portions 75, 76 and 77. These are arranged to contain and guide retainer means 84 which is held in place by spring 86. Latch guide members 80 are provided which extend forwardly from the front surface of the intermediate wall 32 and guide the motion of the latch member 68. A spring buttress pad 82 extends into the upper stem of the latch member from the sidewall 33 of the camera. One end of spring 86 bears on the buttress pad 82 with an intermediate portion bearing on flange portion 75 to urge the latch member in the direction of arrow 83, and an extension of the spring continues beyond flange portion 75 and bears on the retainer member 84 urging it in a direction transverse to arrow 83 (to the left in FIG. 3). The retainer member 84 is provided with a tongue portion 85 which is arranged to engage, under the influence of spring 86, edge 88 of opening 27 in wall 32 when the latch member has been moved in a direction opposite to arrow 83 sufficiently far to disengage latch hook 26 from the latch 24 on the camera loading door.

Figures 5, 6:
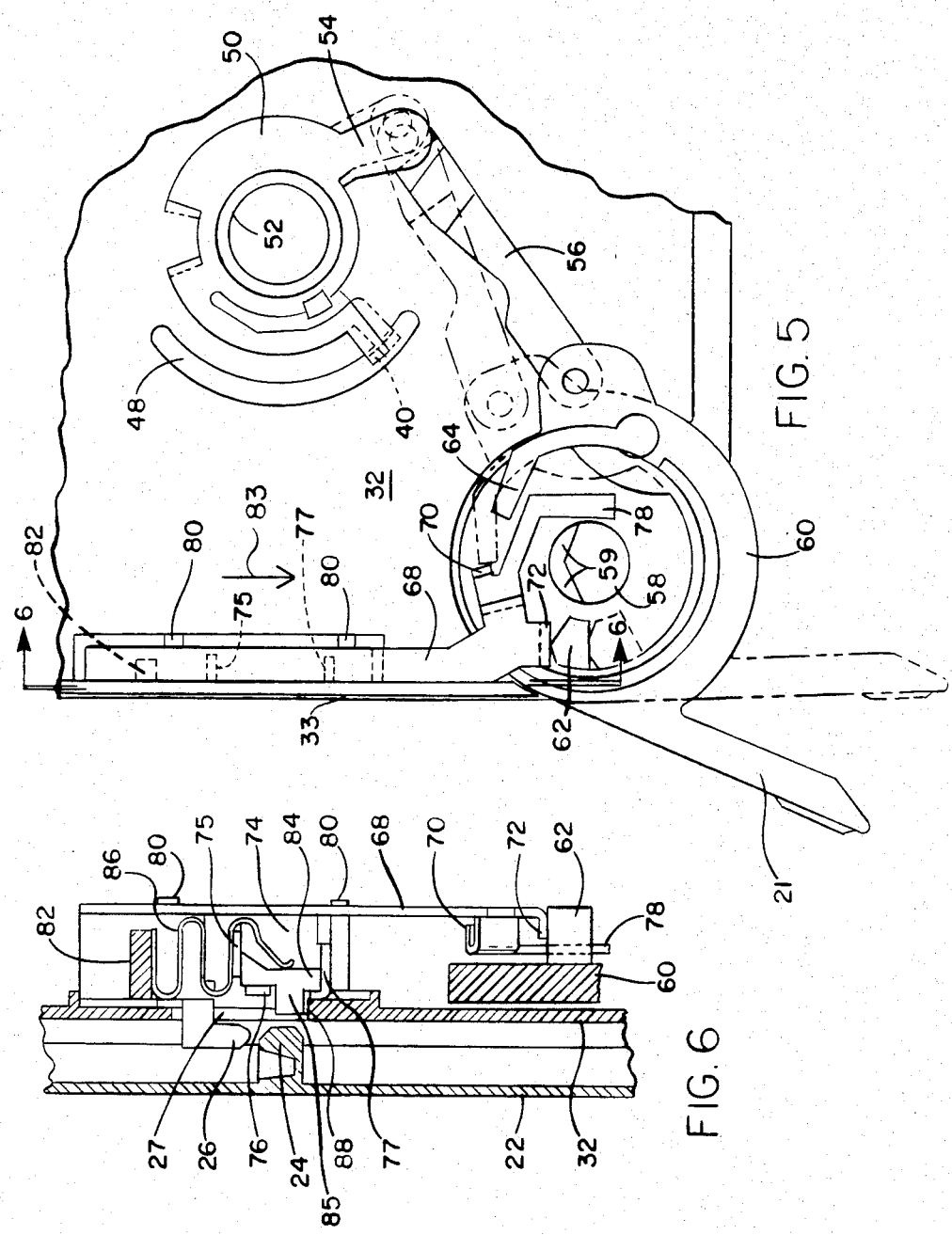
FIG. 5 is a view similar to FIG. 2 with the actuating member illustrated in the position where the dark slide is closed and the latch is disengaged from the film loading door.
FIG. 6 is a sectional view of the latch member taken along line 6—6 of FIG. 5.

Operation of the door latch/dark slide interlock is illustrated with regard to FIGS. 2, 3, 5 and 6. In FIGS. 2 and 3, the door latch/dark slide interlock is illustrated with the dark slide open and the camera loading door latched closed, i.e. as viewed in FIG. 2: the dark slide operating pin 40 is in the extreme clockwise position with respect to arcuate slot 48 in the camera intermediate wall; the actuating member 60 is in the extreme counterclockwise position with the lever 21 in the stored position closely adjacent the camera wall; the latch hook 26 (see FIG. 3) is in engagement with the loading door latch 24; and the entire latch member 68 is in its lowermost position. To close the cartridge dark slide and to unlatch the camera loading door, lever 21 is manually engaged and moved clockwise, rotating actuating member 60 clockwise. During about the first 90° of motion of the actuating member the dark slide operating lever 50 is rotated counterclockwise via its connection with the actuating member through link 56. During this rotation of operating lever 50, the dark slide engaging lever 40 is moved counterclockwise in arcuate slot 48 and by its engagement with the dark slide in the film cartridge, closes the dark slide. This position is illustrated in phantom in FIG. 5. It will be noted that at this position, the latch member 68 has not been moved and it is not until the dark slide has been closed that cam portion 62 on the actuating member 60 engages flange 72 at the lower end of the latch member. Only thereafter, as the actuating member moves from the position illustrated in phantom in FIG. 5 to the position illustrated in full in FIG. 5, is the latch member 68 moved. As the actuating member engages the latch member, at the location indicated in phantom in FIG. 5, and continues to move in the clockwise direction the latch member 68 is lifted, withdrawing the latch hook 26 from engagement with the camera loading door hook 24 permitting the door to be opened. When the latch member reaches the uppermost position, illustrated in FIGS. 5 and 6, the retainer means 84 is urged to the left by spring 86 whereby the tongue portion 85 thereof engages the edge 88 of opening 27 in the camera intermediate wall, holding the latch member in that position until the camera loading door is again fully closed.

While the latch member 68 is retained in the uppermost position by engagement of the retainer means 84 with the edge 88 of the opening, it is not possible to turn the actuating member 60 in the counterclockwise direction to open the dark slide because of the interference of cam portion 64 on the actuating member with flange 70 of the latch member. This construction is sufficiently strong that the camera user would risk breaking lever 21 before being able to override the interlock provided. However, when the camera loading door is pushed closed and the door hook 24 engages the end of the tongue portion 85 of the retainer means, the retainer means is pushed out of engagement with the edge of the opening, permitting the spring 86 to force the latch member 68, via engagement with flange 75 thereof, downwardly reengaging the latch hook 26 with the loading door hook 24. Once the retainer means is disengaged from the edge of the opening and the spring 86 has pushed the latch member downward, flange 70 is moved out of the path of cam portion 64, permitting the actuating member to be rotated counterclockwise, opening the cartridge dark slide. At the same time, cam surface 66 of the actuating member positively engages the edge of flange 70, drawing the latch member positively downward into engagement with the loading door latch hook 24 thereby assuring that the door is securely engaged (rather that just relying on the force of spring 86) and that no amount of jarring or manipulation of the camera would cause the latch member to inadvertently compress the spring releasing the camera loading door.

Figure 8:
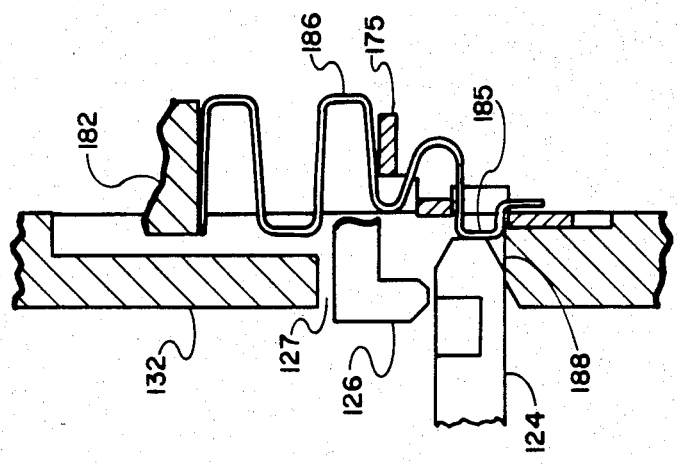
FIG. 8 is a view of the alternative embodiment with the latch member in the disengaged position.
Figure 7:
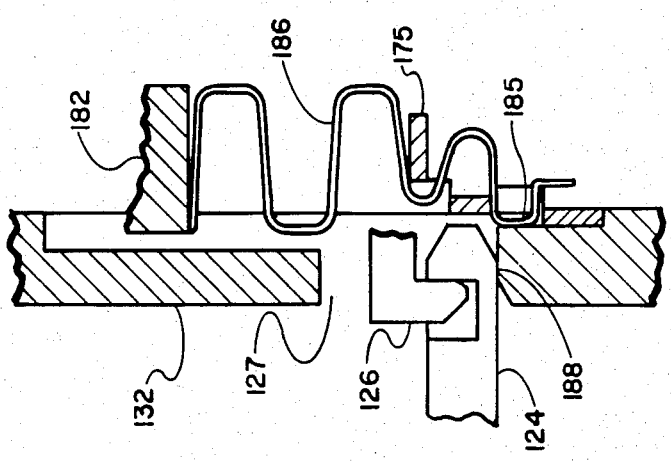
FIG. 7 is an enlarged section of an alternative embodiment of the latch member in the engaged position.

An alternative embodiment is illustrated in FIGS. 7 and 8 wherein like elements are given the same reference numeral as in FIGS. 1-6 with the prefix "1". In this embodiment the retainer means is provided by forming the spring 186 with an integral tongue portion 185 which engages the edge 188 of the opening in the camera wall to retain the latch member 126 in the open position until the door latch hook 124 reengages the tongue portion of the spring 186 to disengage it from the opening. This embodiment provides all of the features of the preferred embodiment but eliminates the necessity for a separate retainer element.

Accordingly, it will be seen that the present invention provides a camera loading door interlock which is simple and inexpensive and yet which assures that the proper sequence of dark slide opening and closing is obtained before the camera loading door is unlatched.

The invention has been described with reference to specific embodiments and variations, but it should be apparent that other modifications and variations can be made within the spirit and scope of the invention, which is defined by the following claims.

I claim:

1. In a camera arranged to accept a film cartridge with a dark slide which is movable independently of the film, said camera having a cartridge loading door, a latch member arranged to engage said door when said door is in a closed position, spring means for urging said latch member into engagement with said door, a movable dark slide-engaging lever, and a movable actuating member operatively connected to said dark slide-engaging lever, the improvement comprising:

disengaging means on said actuating member for positively engaging said latch member and for moving said latch member against the force of said spring means into a disengaged position for disengaging said door after said actuating member has first moved said dark slide-engaging lever to close said dark slide;

a retainer means for holding said latch member in said disengaged position, said retainer means being engageable by said door only when said door is closed for releasing said latch member from said disengaged position whereby said door is engaged by said latch member and held closed; and interlock means on said actuating member cooperating with said latch member for preventing movement of said actuating member to open said dark slide until said door is engaged by said latch member and for positively engaging said latch member when said dark slide is open to pull said latch member into positive engagement with said door.

2. In a camera arranged to accept a disk film cartridge with a dark slide which is movable independently of the film disk, said camera having a cartridge loading door, a linearly movable latch member arranged to engage said door when said door is in a closed position, spring means for urging said latch member into engagement with said door, an arcuately movable dark slide-engaging lever, and a rotatable actuating lever operatively connected to said dark slide-engaging lever, the improvement comprising:

disengaging means on said actuating lever for positively engaging said latch member and for moving said latch member against the force of said spring means into a disengaged position for disengaging said door only after said actuating lever has first moved said dark slide-engaging lever to close the dark slide;

a retainer element carried by said latch member and movable transversely of said latch member for engaging a portion of said camera and holding said latch member in said disengaged position, said retainer element being engageable by said door only when said door is closed for releasing said latch member from said disengaged position whereby said door is engaged by said latch member and held closed; and interlock means on said actuating lever cooperating with said latch member for preventing movement of said actuating lever to open said dark slide until said door is engaged by said latch member and for positively engaging said latch member when said dark side is open to pull said latch member into positive engagement with said door.

3. The invention according to claim 2 wherein a first portion of said spring means is arranged to resiliently resist the linear movement of said latch member and a second portion is arranged for movement transversely of said latch member.

4. The invention according to claim 3 wherein said second portion of said spring means forms said retainer element.

5. The invention according to claim 3 wherein said second portion of said spring means urges said retainer element into engagement with said camera portion.

* * * * *